United States Patent
Dimou (10) Patent No.: US 9,374,715 B2
(45) Date of Patent: Jun. 21, 2016

(54) INTERCELL INTERFERENCE COORDINATION FOR MACHINE TO MACHINE COMMUNICATIONS

(71) Applicant: Telefonaktiebolaget L M Ericsson (publ), Stockholm (SE)

(72) Inventor: Konstantinos Dimou, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 13/627,264

(22) Filed: Sep. 26, 2012

(65) Prior Publication Data

US 2014/0087721 A1   Mar. 27, 2014

(51) Int. Cl.
*H04W 72/08* (2009.01)
*H04W 24/02* (2009.01)
*H04W 92/20* (2009.01)
*H04W 72/04* (2009.01)

(52) U.S. Cl.
CPC ............ *H04W 24/02* (2013.01); *H04W 72/082* (2013.01); *H04W 72/0426* (2013.01); *H04W 92/20* (2013.01)

(58) Field of Classification Search
CPC .... H04W 24/02; H04W 72/082; H04W 92/20
See application file for complete search history.

(56) References Cited

U.S. PATENT DOCUMENTS

| | | | | | |
|---|---|---|---|---|---|
| 2010/0261482 | A1* | 10/2010 | Guey | ...................... | H04B 7/024 455/452.2 |
| 2010/0303029 | A1* | 12/2010 | Jang | ................... | H04W 72/1257 370/329 |
| 2011/0124334 | A1* | 5/2011 | Brisebois | ............... | H04W 48/16 455/434 |
| 2012/0076025 | A1* | 3/2012 | Barbieri | ................. | H04L 5/0023 370/252 |
| 2012/0114028 | A1* | 5/2012 | Davydov | ............... | H04B 7/024 375/224 |
| 2012/0282864 | A1* | 11/2012 | Dimou | ................... | H04W 36/22 455/67.14 |
| 2012/0307869 | A1* | 12/2012 | Charbit | .................. | H04B 1/715 375/132 |
| 2013/0053078 | A1* | 2/2013 | Barbieri | ................. | H04B 7/024 455/509 |

(Continued)

FOREIGN PATENT DOCUMENTS

| | | | | | |
|---|---|---|---|---|---|
| GB | WO 2012104606 | A1 * | 8/2012 | .......... | H04W 72/082 |
| JP | EP 2603030 | A1 * | 6/2013 | ............ | H04W 16/14 |

(Continued)

OTHER PUBLICATIONS

Qualcomm Incorporated: "Carrier-Based HetNet ICIC DL Interference Scenario: Solutions," 3GPP Draft; R3-120302, 3$^{rd}$ Generation Partnership Project (3GPP), Mobile Competence Centre; 650, Route Des Lucioles, F-06921, vol. RAN WG3, 20120206-20120210, Jan. 31, 2012.

(Continued)

*Primary Examiner* — Mehmood B Khan
(74) *Attorney, Agent, or Firm* — Myers Bigel & Sibley, P.A.

(57) ABSTRACT

A method is provided for operating a radio network node of a radio communications network. A wireless device in a cell of a first radio network node may be identified as having at least one transmission-specific property that affects a sensitivity to interference. Data identifying the at least one transmission-specific property corresponding to the wireless device in the cell of the first radio network node is sent from the first radio network node to a second radio network node that includes at least a portion of an overlapping cell relative to the first radio network node. Related methods in radio network nodes and apparatuses are disclosed.

18 Claims, 9 Drawing Sheets

(56) References Cited

U.S. PATENT DOCUMENTS

| | | | | |
|---|---|---|---|---|
| 2013/0107704 A1* | 5/2013 | Dinan | H04B 7/2656 | 370/230 |
| 2013/0107705 A1* | 5/2013 | Dinan | H04W 72/0446 | 370/230 |
| 2013/0107826 A1* | 5/2013 | Dinan | H04W 16/32 | 370/329 |
| 2013/0107827 A1* | 5/2013 | Dinan | H04W 16/32 | 370/329 |
| 2013/0107828 A1* | 5/2013 | Dinan | H04W 72/0446 | 370/329 |
| 2013/0114522 A1* | 5/2013 | Frenne | H04L 5/0094 | 370/329 |
| 2013/0142062 A1* | 6/2013 | Dinan | H04W 24/00 | 370/329 |
| 2013/0142138 A1* | 6/2013 | Dinan | H04W 24/00 | 370/252 |
| 2013/0142288 A1* | 6/2013 | Dinan | H04W 72/04 | 370/329 |
| 2013/0142291 A1* | 6/2013 | Dinan | H04L 27/2649 | 375/340 |
| 2013/0170376 A1* | 7/2013 | Dinan | H04W 72/12 | 370/254 |
| 2013/0170396 A1* | 7/2013 | Dinan | H04L 27/2666 | 375/343 |
| 2013/0235812 A1* | 9/2013 | Heo | H04W 72/0426 | 370/329 |
| 2013/0244678 A1* | 9/2013 | Damnjanovic | H04W 72/12 | 370/252 |
| 2013/0250882 A1* | 9/2013 | Dinan | H04W 72/1289 | 455/452.1 |
| 2013/0294281 A1* | 11/2013 | Lee | H04W 24/10 | 370/252 |
| 2013/0301458 A1* | 11/2013 | Barbieri | H04W 76/048 | 370/329 |
| 2013/0301525 A1* | 11/2013 | Xu | H04W 24/10 | 370/252 |
| 2013/0301549 A1* | 11/2013 | Chen | H04L 5/0037 | 370/329 |
| 2013/0301552 A1* | 11/2013 | Xu | H04W 4/005 | 370/329 |
| 2013/0329592 A1* | 12/2013 | Beale | H04W 72/082 | 370/252 |
| 2014/0029524 A1* | 1/2014 | Dimou | H04W 16/10 | 370/329 |
| 2014/0029558 A1* | 1/2014 | Frederiksen | H04L 5/001 | 370/329 |
| 2014/0056168 A1* | 2/2014 | Jung | H04W 24/08 | 370/252 |

FOREIGN PATENT DOCUMENTS

| | | | | |
|---|---|---|---|---|
| SE | WO 2012087204 A1 * | 6/2012 | | H04W 36/0083 |
| WO | WO 2012087204 * | 6/2012 | | H04W 36/00 |
| WO | WO 2012/104181 A1 | 8/2012 | | |

OTHER PUBLICATIONS

Lars Lindbom et al., "Enhanced Inter-Cell Interference Coordination for Heterogeneous Networks in LTE-Advanced: A Survey," Internet Citation, Dec. 6, 2011, pp. 1-18, retrieved http://arxiv.org/ftp/arxiv/papers/1112/1112.1344 on Jan. 30, 2012.

Notification of Transmittal of the International Search Report and the Written Opinion of the International Searching Authority, or the Declaration, Application No. PCT/IB2013/058825, Date of Mailing: Apr. 23, 2014, 10 pages.

* cited by examiner

INTERCELL INTERFERENCE COORDINATION FOR MACHINE TO MACHINE COMMUNICATIONS

TECHNICAL FIELD

The present disclosure is directed to wireless communications and, more particularly to machine to machine type communications.

BACKGROUND

Machine Type Communications (MTC) are expected to contribute heavily to connectivity and traffic within the mobile broadband industry. The GSM/EDGE system already serves a rapidly expanding market for MTC. Mobile communications operators have expressed interest in accommodating traffic that serves wireless sensors/devices within modern evolved networks such as those based on LTE. As part of this, it would be incumbent on them to handle MTC traffic served by existing cellular networks such as GSM/EDGE and to provide a transition for such traffic from e.g. GPRS/EDGE to future versions of cellular systems, such as 3GPP Long Term Evolution Advance (LTE-A, or LTE-Advanced).

Wireless sensor networks have gained increasing interest from academia and industry. Such networks have, however, predominantly been built around short range communication links, such as those based on Bluetooth, and more recently on the Zigbee standard. It is of particular interest to examine whether existing and future cellular systems can be modified to efficiently accommodate the traffic from these wireless sensor devices. This is a challenging task considering that (1) the latest versions of existing cellular systems, 3GPP systems, such as High Speed Packet Access (HSPA), LTE, or LTE-A, or IEEE systems, such as 802.16 (WiMax), are conceived primarily with the goal of providing service mainly to mobile broadband users and (2) there is a requirement from operators that these wireless devices (sensors) are low cost and have high energy efficiency.

Signaling mechanisms in existing and future 3GPP and IEEE networks have been conceived with the intention of securing a robust connection/session lasting for long periods of time, and involving transmission of large data volumes. In this respect, signaling mechanisms and protocols involving several long messages amounting to hundreds or thousands of kilobytes of data are not considered as particularly significant overhead when compared to the amount of data traffic exchanged within a session.

However, many wireless sensor devices are expected to transmit with very low activity and with long periods of inactivity between transmissions. Also, such devices typically transmit small amounts of information—typically a few hundred octets of data, indicating, e.g. a measurement, or presence. Some wireless sensor devices serve as actuating receivers, where a short message from the network of a few hundred octets of data may need to be processed and acted on. The existing signaling mechanisms for establishing and maintaining a connection are considered as considerably "heavy" for such device types or application categories, and there is a real concern that the volume of signaling traffic can quickly overwhelm the cellular network. In other words, the signaling overhead is no longer negligible for very small transmissions. In addition, keeping a connection up or reestablishing a connection on wake-up may constitute an undue burden on a device with a targeted battery life that spans years.

In the most common scenario, devices are anticipated to transmit in uplink a single packet containing measurements, warnings, or other types of information to the cellular network. Hence, data transmissions occur mainly in the uplink, while the downlink serves mainly for transmitting feedback and link control information to devices.

In this respect, entire radio network interfaces and radio resource management algorithms require new approaches. However, in order to perform these modifications to radio protocol architectures and to radio resource management (RRM), there is a need to have information on the network side regarding some characteristics of machine devices related to their capabilities, including, for example, their mobility pattern, energy supply, and traffic pattern. An RRM algorithm that may be important for efficient use of radio resources in the system and which may affect the energy consumption of machine devices and/or user equipment may include Intercell Interference Coordination (ICIC).

Existing ICIC mechanisms may be autonomous in which decisions are performed internally or coordinated in which neighbor base stations coordinate their transmissions via explicit signaling. Messages exchanged for ICIC purposes, however, may not provide awareness to neighboring cells that certain physical resource blocks and/or time slots may have high levels of sensitivity to other cell interference due to limited complexity and energy management of sensors and/or other devices.

A standardized message may be exchanged between neighboring cells for ICIC. For example, as described in §9.1.2.1 of 3GPP TS 36.423, version 11.1.0, which is incorporated by reference herein in its entirety, a "Load Information" message may be used to exchange messages between neighboring cells for ICIC purposes. The "Load Information" message may include, for example, Informational Elements (IEs) "UL Interference Overload Indication" and "UL High Interference Indication", among others. Both messages may be related to uplink interference, which may be particularly beneficial in the context of a UE having greater uplink traffic, such as machine type communications (MTC).

The IE "UL Interference Overload Indication" is a message that may be transmitted from a given cell 110 to its neighboring cells 110 when a high level of uplink interference in certain physical resource blocks (PRBs) is experienced. In this regard, the "UL Interference Overload Indication" may generally be a reactive ICIC mechanism and thus less effective at preventing cell interference.

The IE "UL High Interference Indication" is a message transmitted from a given cell 110 to its neighboring cells 110 and may indicate the PRBs in which high interference sensitivity may exist. As such, neighboring cells 110 are notified of the PRBs that are vulnerable and may be easily affected by other cell interference.

Both the "UL Interference Overload Indication" and the "UL High Interference Indication" IEs may be used to perform ICIC for MTC. However, the "UL Interference Overload Indication" IE is not preventative. Additionally, although the "UL High Interference Indication" may be used for the PRBs and timeslots for which wireless devices such as sensors are scheduled, neighboring cells 110 may not be aware of the sensitivity to other cell interference that may be increased by low complexity and/or low power wireless devices.

Accordingly, there is a need for a method and device for operating a radio network node to provide ICIC for machine to machine communications.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

It is therefore an object to address at least some of the above mentioned disadvantages and/or to improve performance in a wireless communication system.

One or more of the above described problems may be overcome by providing a machine type communication information element that can be exchanged between radio network nodes of a radio communications network.

Some embodiments of the present invention are directed to methods of operating a radio network node of a radio communications network. Embodiments of such methods may include identifying a wireless device in a cell of a first radio network node as having at least one transmission-specific property that increases or otherwise affects a sensitivity to interference and sending, from the first radio network node to a second radio network node that includes at least a portion of an overlapping cell relative to the first radio network node, data identifying the at least one transmission-specific property corresponding to the wireless device in the cell of the first radio network node.

In some embodiments, sending the data identifying the at least one transmission-specific property of the wireless device includes sending mobility pattern data of the wireless device that identifies mobility or lack of mobility of the wireless device, sending transmission frequency data of the wireless device that identifies how frequently the wireless device transmits, and sending interference sensitivity data corresponding to the wireless device that identifies a sensitivity to interference of the wireless device.

Some embodiments provide that the data identifying the at least one transmission-specific property includes a frequency range and transmission time interval allocated by the first radio network node to the wireless device to identify resource blocks that the second radio network node should avoid allocating to another wireless device.

In some embodiments, sending data identifying the at least one transmission-specific property of the wireless device includes sending a bitmap that includes a plurality of bit fields, at least one which is associated with a physical resource block allocated to the wireless device by the first radio network node for communications between the first radio network node and the wireless device. Some embodiments further include sending an information element in a load information message such that the information element includes a machine type communication (MTC).

In some embodiments, the information element includes physical resource block identifiers corresponding to the physical resource blocks of the first radio network node and the bitmap having a plurality of bit positions corresponding to the physical resource blocks of the first radio network node. One of the bit positions may be set to one of: 1) a first value corresponding to no machine type communication wireless devices being allocated to the corresponding physical resource blocks or a second value corresponding to a machine type communication terminal being allocated to the corresponding physical resource block. Some embodiments provide that responsive to one of the bit positions including the second value, the information element further includes a populated data field that includes the data identifying the at least one transmission-specific property corresponding to the machine type communication terminal.

The radio communications network may be configured to operate as a 3GPP ($3^{rd}$ Generation Partnership Project) Long Term Evolution (LTE) radio communications network. In some embodiments, sending the bitmap includes sending the bitmap using a 3GPP X2 and/or WiMax R8 interface from the first radio network node to the second radio network node. Some embodiments provide that sending the bitmap includes sending the bitmap using a 3GPP S1 and/or WiMax R6 interface. In some embodiments, sending the bitmap includes sending a bitmap that includes a multiple bit strings that may each correspond to a different one of multiple transmission time intervals. Ones of the bit strings may include multiple bit fields that may each be associated with a physical resource block corresponding to a different frequency range.

Some embodiments provide that the wireless device in the cell of the first radio network node includes a mobility pattern that identifies the wireless device as being a stationary device. In some embodiments, the wireless device may include transmission frequency data that identifies that the wireless device transmits at a regular transmission interval. Some embodiments provide that a transmission-specific property that increases or otherwise affects sensitivity to interference indicates proximity of the wireless device to an adjacent cell or a low transmission power of the wireless device relative to other wireless devices.

Some embodiments of the present invention are directed to methods of operating a radio network node of a radio communications network. Such methods may include receiving at a first radio network node of the radio communications network, at least one transmission-specific property corresponding to a wireless device being serviced by a second radio network node and adjusting at least one parameter for providing service to at least one wireless device being serviced by the first radio network node responsive to the transmission-specific property corresponding to the wireless device being serviced by the second radio network node.

In some embodiments, receiving a transmission-specific property of the wireless device may include receiving a mobility pattern of the wireless device being serviced by the second radio network node that identifies mobility or lack of mobility of the wireless device, receiving a transmission frequency of the wireless device being serviced by the second radio network node that identifies how frequently the wireless device transmits, and receiving an interference sensitivity corresponding to the wireless device being serviced by the second radio network node that identifies a sensitivity to interference of the wireless device.

In some embodiments, a service area of the first radio network node includes an overlapping portion with a service area of the second radio network node and receiving the at least one transmission-specific property of the wireless device includes receiving a bitmap that includes a plurality of bit fields that may be associated with physical resource blocks corresponding to the second radio network node. Some embodiments provide that receiving the bitmap includes receiving an information element in a load information message, such that the information element includes a machine type communication (MTC).

In some embodiments, adjusting at least one service to the at least one wireless device being serviced by the first radio network node includes scheduling a communication activity of the first radio network node to occur non-proximate a cell border corresponding to the wireless device being serviced by the second radio network node.

Some embodiments provide that the wireless device being serviced by the second radio network node includes a mobility pattern corresponding to a stationary device and is operable to transmit to the second radio network node on a regular interval. In some embodiments, the wireless device being serviced by the second radio network node is operable to transmit to the second radio network node in response to an event that is detected by the wireless device being serviced by the second radio network node.

Some embodiments of the present invention are directed to methods of operating a radio communications network. Such methods may include exchanging, between a first radio network node of the radio communications network and a second radio network node, at least one transmission-specific property corresponding to machine type communication wireless devices in the first and second radio network nodes. At least one service within the first or second radio network nodes may be adjusted responsive to receipt of the at least one transmission-specific property corresponding to machine type communication wireless device in the other one of the first or second radio network node to reduce interference with the machine type communication wireless device.

Other wireless devices, radio network nodes, and methods according to embodiments of the invention will be or become apparent to one with skill in the art upon review of the following drawings and detailed description.

It is intended that all such additional wireless devices, radio network nodes, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, various embodiments of the present invention are described herein in the context of operating in a 3GPP ($3^{rd}$ Generation Partnership Project) Long Term Evolution (LTE) heterogeneous radio communications network. It will be understood, however, that the present invention is not limited to such embodiments and may be embodied generally in any type of radio communications network.

Although the description below focuses, for purposes of illustration, on embodiments in which the described techniques are utilized with respect to providing intercell interference coordination (ICIC) for machine to machine communications, where such machines may be referred to as user equipment (UE), the described techniques may be applied with respect to any wireless device capable of transmitting information wirelessly. As used herein, wireless device may include any device that can communicate through one or more wireless RF channels with a radio network node, and may include, but is not limited to, a mobile telephone (cellular telephone), wireless terminal, mobile station, laptop/portable computer, tablet computer, desktop computer, electronic book reader, and/or game console. Additionally, the wireless devices described herein may include devices that are somehow limited in their two-way communication capabilities or that otherwise lack some of the capabilities of the example UE. For example, the described wireless devices may represent meters, detectors, sensors or identification tags that are capable of transmitting information to the wireless network, but that can only receive certain types of information (e.g., power control commands) from the network or that can only receive information at certain, predetermined times. Furthermore, these wireless devices may include not only mobile devices such as the example UE, but also devices that are fixed, installed in a particular location, or otherwise limited in their movement.

Figure 1:
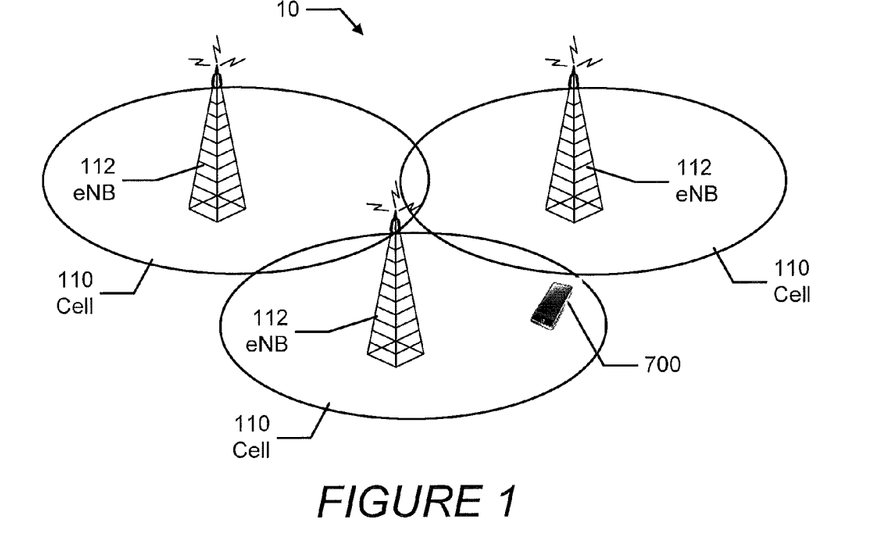
FIG. 1 is a block diagram of a heterogeneous radio communications network that includes a plurality of cells that are located substantially adjacent one another according to some embodiments of the present invention.

Reference is now made to FIG. 1, which is a block diagram of a heterogeneous radio communications network that includes a machine type communication (MTC) deployment and a plurality of cells that are located substantially adjacent one another according to some embodiments of the present invention. The radio communication network 10 may be a radio access network (RAN) that provides communication for a UE to communicate with one or more core networks. The RAN covers a geographical area which is divided into cell areas, with each cell area being served by a radio network node (also referred to as a base station, a network node, a "NodeB", and/or enhanced NodeB "eNodeB" or "eNB"). In heterogeneous networks, a mixture of cells of differently sized and overlapping coverage areas are deployed. One example of such deployments is illustrated in FIG. 1 where multiple different cells 110 are provided by eNBs 112 and may provide communication for UE 700. Examples of UE 700 include detection instruments, for use in agriculture, forestry, and other applications, with large areas of deployment and relatively low access to power, mobile telephones, personal digital assistants, electronic readers, portable electronic tablets, personal computers, laptop computers, vending and other publicly available service and/or product delivery devices, manned and/or unmanned vehicles, and/or appliances among others. In some embodiments, the UE 700 may be characterized by traffic that is more dominantly uplink, however, the devices and methods herein may apply equally to UE 700 having traffic that is significantly downlink as well.

In use and operation, device specific ICIC may be provided for UE 700 determined as susceptible to interference by virtue of reduced power, complexity and/or location relative to neighboring cells.

Figure 2:
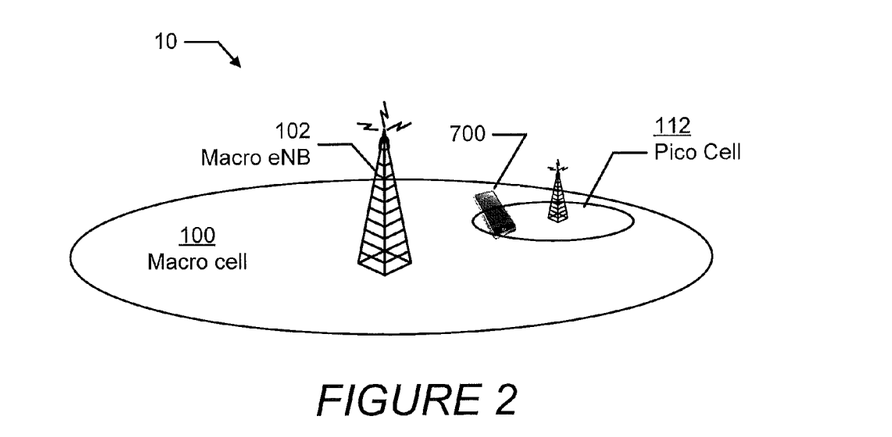
FIG. 2 is a block diagram of a heterogeneous radio communications network that includes a pico cell that is located within a macro cell according to some embodiments of the present invention.

FIG. 2 is a block diagram of a heterogeneous radio communications network that includes a pico cell that is located within a macro cell according to some embodiments of the present invention. Pico cells 110 are provided by pico eNBs 112 deployed within the coverage area of a macro cell 100 provided by a macro eNB 102. Other examples of low power radio network nodes, also referred to as points, in heterogeneous networks are home base stations and relays. As will be further discussed below, the large difference in output power (e.g. 46 dBm in macro cells 100 and 30 dBm or less in pico cells 110) results in a different interference situation than what is seen in networks where all base stations have the same output power.

The aim of deploying low power nodes such as pico base stations 112 within the macro cell coverage area 100 is to improve system capacity by means of cell splitting gains as well as to provide users with wide area experience of very high speed data access throughout the network. Heterogeneous deployments can be particularly effective to cover traffic hotspots, i.e. small geographical areas with high user densities served by e.g. pico cells 110, and they represent an alternative deployment to denser macro networks. Similar to the system discussed above regarding FIG. 1, device specific ICIC may be provided for UE 700 determined as susceptible to interference by virtue of reduced power, complexity and/or location relative to a macro cell 100.

Figure 3:
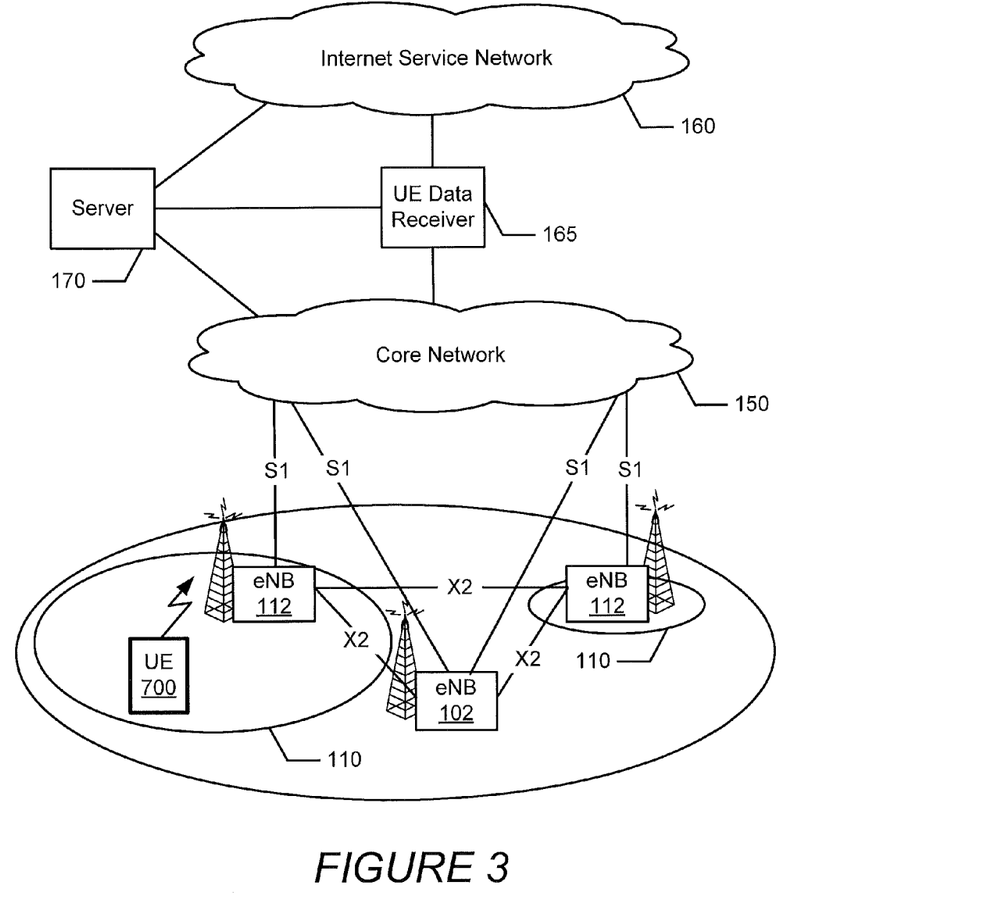
FIG. 3 is a block diagram illustrating a heterogeneous radio communications network that is configured to operate according to some embodiments of the present invention.

Reference is now made to FIG. 3, which is a block diagram illustrating a heterogeneous radio communications network that is configured to operate according to some embodiments of the present invention. The example radio communications network may be a Long Term Evolution (LTE) network. The network includes a first network node eNB 102 (e.g., macro base station) that has a larger cell than a pair of second network nodes eNBs 112 (e.g., pico/femto base stations). The smaller cells provided by the second network nodes eNBs 112 are within the larger cell provided by the first network node eNB 102.

The first and second network nodes eNBs 102 and 112 may be connected to communicate with one or more core networks 150 through S1 interfaces, and may be connected to communicate with each other through X2 interfaces, as is well known to one who is skilled in the art.

The core network 150 may access an internet service network 160 via one or more servers 170. A UE data recipient 165 may receive data transmitted from the UE 700 via one or more eNBs 112, the core network 150, a server 170 and/or an internet service network 160. For example, the UE 700 may be a wireless device that includes a sensor for sensing a condition at a given location. The UE 700 may send data reporting the condition to the UE data recipient 165. In other example, the UE may be a wireless device that is operable to collect data, which may be transmitted to the UE data recipient 165. In some embodiments, the transmission of the collected data may be periodic and scheduled for uplink transmission at given intervals while some other embodiments provide that the collected data may be transmitted based on one or more conditions or events occurring at the UE 700 and/or the UE data recipient 165.

In some embodiments, information corresponding to MTC within a given cell 110 may be exchanged between base stations of neighboring cells 110 via the S1 and/or the X2 interface. Such information may include the existence of UEs 700 (e.g., wireless devices, such as sensors or data collectors) in certain locations of the given cell 110, a transmission pattern of the UEs 700, a mobility pattern of the UEs 700 and a traffic pattern of the UEs 700. For example, a transmission pattern may include information such as allocated PRBs and transmission time intervals allocated to the UEs 700. A mobility pattern may describe whether UEs 700 are static or whether there are known mobility patterns and/or limits of mobility of the UEs 700. A traffic pattern may describe uplink traffic characteristics including uplink data quantity, frequency of transmissions and/or schedule of transmissions.

Although disclosed herein in the context of specific protocols, standards and/or formats, the invention is not so limited and may be used the context of other communication protocols and/or standards, whether currently developed or not.

Time synchronization between base stations may be used to ensure that ICIC across layers will work efficiently in heterogeneous networks. Synchronization can be particularly important for time domain based ICIC schemes where resources are shared in time on the same carrier.

By way of example, LTE may use orthogonal frequency division multiplexing (OFDM) in the downlink and discrete Fourier transform (DFT)-spread OFDM in the uplink. The basic LTE physical resource can thus be represented as a time-frequency grid of radio interface resources. For example, reference is now made to the FIG. 4, which illustrates a time-frequency grid 200 of radio interface resources that can be used for communications between a radio network node and a wireless device according to some embodiments of the present invention.

Figure 4:
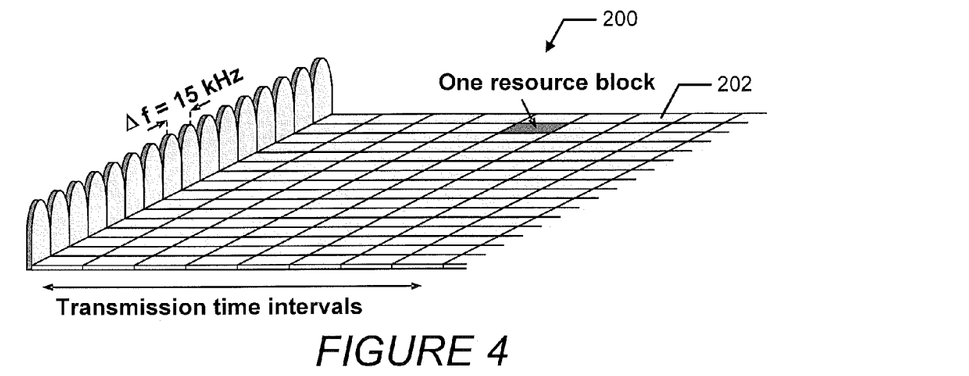
FIG. 4 illustrates a time-frequency grid of radio interface resources that can be used for communications between a radio network node and a wireless device according to some embodiments of the present invention.

In the time domain, LTE downlink transmissions are organized into radio frames, each consisting of equally-sized subframes. In some embodiments, resource allocation may be defined in terms groups of physical resource blocks 202 that correspond to one slot in the time domain and N contiguous frequency band subcarriers in the frequency domain. For example, the frequency band subcarriers may be 15 kHz subcarriers, among others. Each PRB 202 may correspond to a specific frequency band subcarrier in a specific time slot of the transmission time intervals.

Transmissions may be dynamically scheduled in each subframe where the base station transmits downlink assignments/uplink grants to certain UEs 700 via the physical downlink control channel (PDCCH). The PDCCHs are transmitted in the first OFDM symbol(s) in each subframe and spans (more or less) the whole system bandwidth. A UE 700 that has decoded a downlink assignment, carried by a PDCCH, knows which resource elements in the subframe that contain data aimed for the UE 700. Similarly, upon receiving an uplink grant, the UE 700 knows which time/frequency resources it should transmit upon. In LTE downlink, data may be carried by the physical downlink shared channel (PDSCH) and in the uplink the corresponding channel may be referred to as the physical uplink shared channel (PUSCH), Brief reference is now made to FIG. 5, which illustrates a group 204 of PRBs 202 corresponding to a single transmission time interval of radio interface resources that can be used for communications between a radio network node and a wireless device according to some embodiments of the present invention. As illustrated, the group 204 corresponds to a single transmission time interval and each of the PRBs 202 correspond to a single one of the adjacent frequency band subcarriers. For example, as illustrated, a group 204 includes eight different frequency band subcarriers and thus eight PRBs 202. The group 204 that corresponds to a single transmission time interval may include more or less than eight different frequency band subcarriers according to embodiments disclosed herein.

Figure 5:
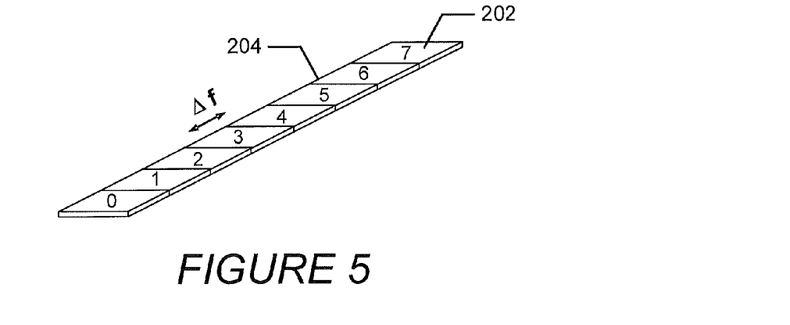
FIG. 5 illustrates a group of physical resource blocks (PRBs) corresponding to a single transmission time interval of radio interface resources that can be used for communications between a radio network node and a wireless device according to some embodiments of the present invention.
Figure 6:
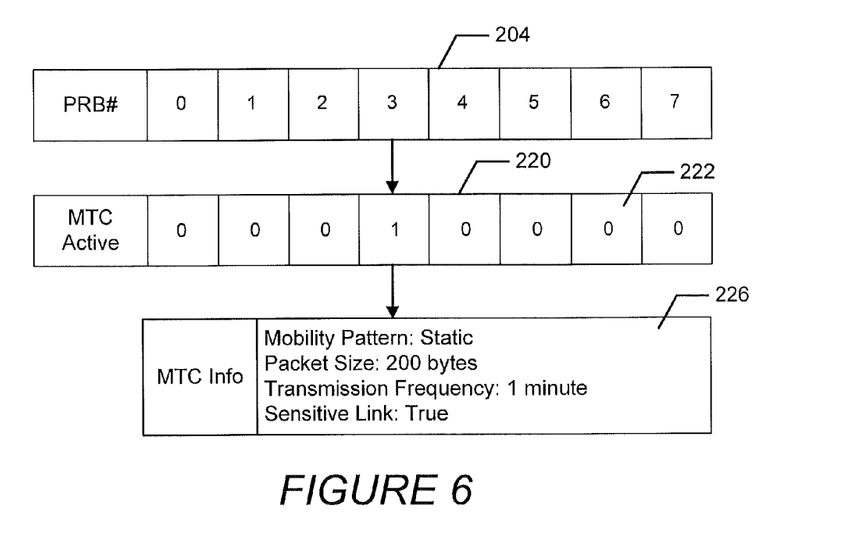
FIG. 6 is a block diagram illustrating a mapping of a the physical resource blocks of FIG. 5 to a data field in accordance with some embodiments of the present invention.

Reference is now made to FIG. 6, which is a block diagram illustrating a mapping of a the physical resource blocks 202 of FIG. 5 to a data field in accordance with some embodiments of the present invention. As described in §9.1.2.1 of 3GPP TS 36.423, version 11.1.0, a "Load Information" message may be used to exchange messages between neighboring cells for ICIC purposes. In this regard, the data fields 220 and 226 may be included in a MTC Load Information IE, which may be referred to as, for example, "Machine Type Communication Information" (MTCI). In some embodiments, an MTCI IE may include one or more bitmaps 220 including bit positions 222 that correspond to each PRB 202. In some embodiments, the MTCI IE may include a bitmap 220 having the same quantity of bits as the quantity of PRBs in the cell and/or system.

As illustrated in the bit position corresponding to PRB #3, if a wireless device (e.g. a sensor or other MTC type device) is active in the PRB, then value of the bit position 202 in the bitmap 220 that corresponds to the active PRB is set to one. Otherwise, any bits corresponding to PRBs not associated with an active wireless device are set to zero.

Some embodiments provide that for any bit position 222 in the bitmap 220 having a value of 1, then information including corresponding to at least one device-specific transmission property may be stored in a structure of the data in the MTCI IE that points to this position. For example, a MTC Info structure 226 corresponding to the active PRB may include data indicating whether the wireless device is static, a packet size of expected uplink traffic from the wireless device, a transmission frequency and/or whether the wireless device is sensitive to other cell interference due to, for example, limited power and/or limited complexity. In this manner, a problem of other cell interference for MTC type devices may be reduced.

The MTCI IE may be transmitted from a base station in a given cell to base stations in one or more neighboring cells. In response to receiving an MTCI IE that identifies a PRB that is allocated to a wireless device having a high sensitivity to other cell interference, the neighboring cell may adjust one or more service parameters to reduce interference with the wireless device in the other cell. For example, neighboring cells may avoid allocating resources in a manner that may interfere with the wireless device.

Figure 7:
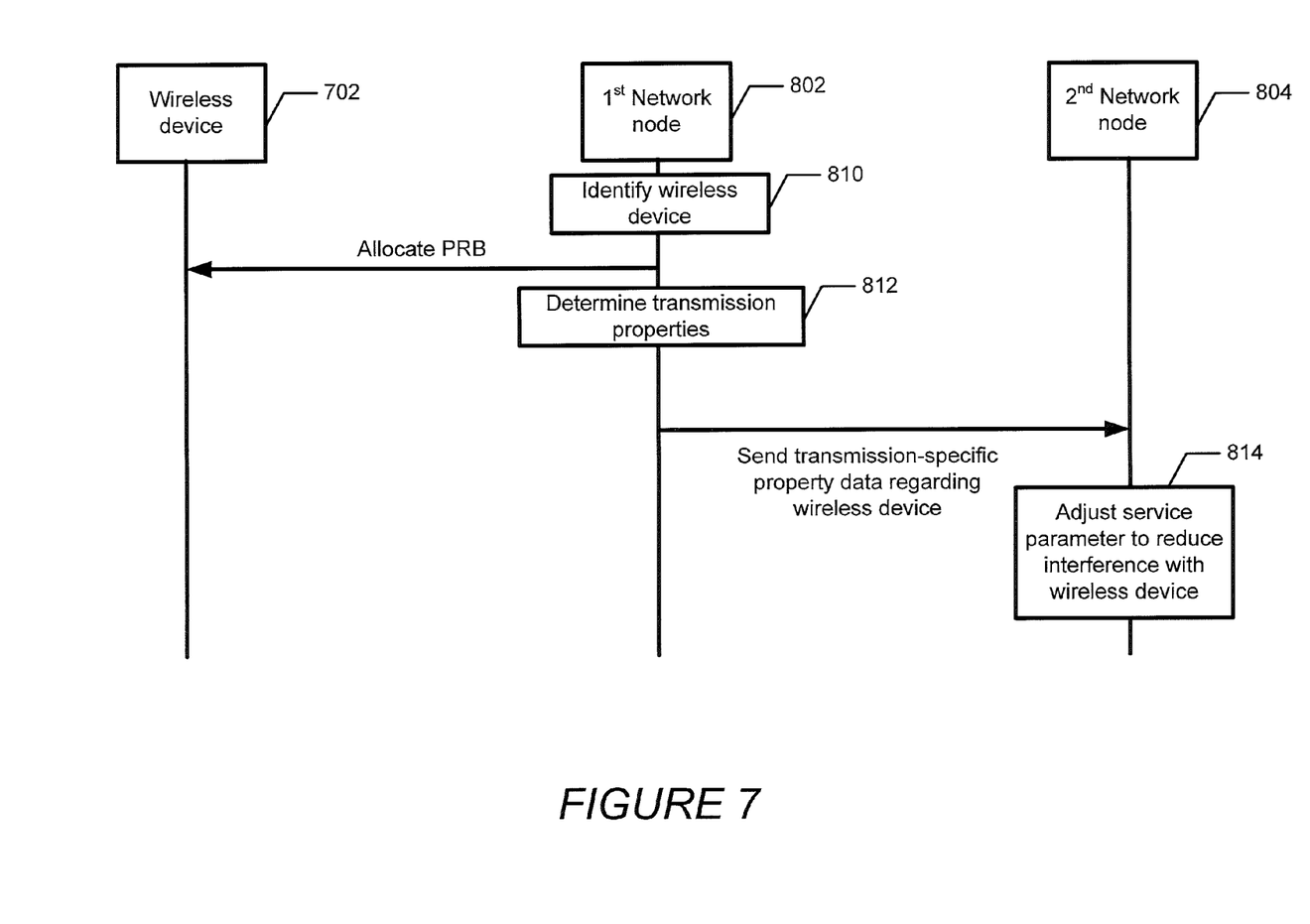
FIG. 7 is a time sequence diagram that illustrates intercell interference coordination according to some embodiments of the present invention.

Reference is now made to FIG. 7, which is a time sequence diagram that illustrates intercell interference coordination according to some embodiments of the present invention. A first network node 802 of a radio network identifies a wireless device 702 (block 810). The first network node 802 may allocate one or more PRBs' to the wireless device 702. The transmission property data of the wireless device 702 are determined by the first network node 802 (block 812).

The first network node 802 may send transmission specific property data regarding the wireless device 702 to a second network node 804. Although only first and second network nodes 802, 804 are illustrated, the radio network may include more network nodes. As such, some embodiments provide that the first network node 802 may send the transmission-specific property data to more network nodes than just the second network node 804.

The second network node 804 may adjust one or more service parameters to reduce interference with the wireless device 702. For example, the second network node 804 may refrain from scheduling resources that are close to a cell border that may be likely to interfere with the MTC transmissions from the wireless device 702. In some embodiments, the transmission-specific property data may include a transmission schedule or transmission interval and the second network node 804 may schedule resources during periods of non-transmission of the wireless device 702.

Some embodiments provide that wireless devices 702 may have a fixed location and/or other transmission-specific property that is semi-persistent. In such cases, the IE's regarding the wireless devices 702 may be transmitted with less frequency and may have reduced data requirements than conventional ICIC related IE's.

Figure 8:
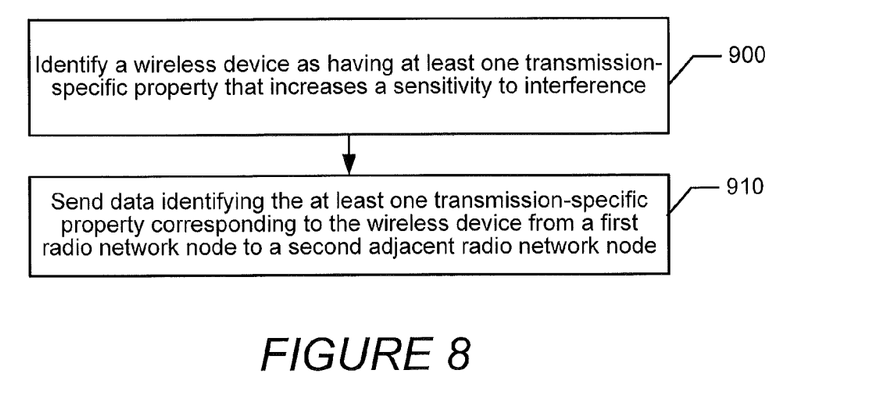
FIGS. 8-15 are flow charts of operations and methods that can be performed to provide intercell interference coordination for machine to machine communications according to some embodiments of the present invention.

FIGS. 8-15 are flow charts of operations and methods that can be performed to provide intercell interference coordination for machine to machine communications according to some embodiments of the present invention. Reference is now made to FIG. 8, which is a flowchart identifying operations for methods and systems for operating a radio network node of a radio communications network. A wireless device in a radio network node of a radio network is identified as having one or more transmission-specific properties that increase a sensitivity to interference (block 900). In some embodiments, the wireless device is identified by virtue of data received from the wireless device responsive to and/or included in a request for service. In some embodiments, the wireless device is identified by data included in one or more uplink transmissions from the wireless device through a base station of the cell. Transmission-specific properties that may increase a sensitivity to interference may include location, power and/or complexity corresponding to the capabilities of the wireless device. For example, a transmission-specific property that increases or otherwise affects a sensitivity to interference may include proximity of the wireless device to an adjacent cell or a low transmission power of the wireless device relative to other wireless devices.

Some embodiments provide that data identifying one or more transmission-specific properties corresponding to the wireless device may be sent from the radio network node to one or more other radio network nodes (block 910). In some embodiments, the other radio network nodes may include radio network nodes that are adjacent and/or that include at least a portion of an overlapping cell relative to the radio network node from which the data is sent. Some embodiments provide that data identifying the transmission-specific property may include a frequency range and transmission time interval allocated by the radio network node to the wireless device to identify resource blocks that neighboring radio network nodes should avoid allocating to another wireless device.

Figure 9:
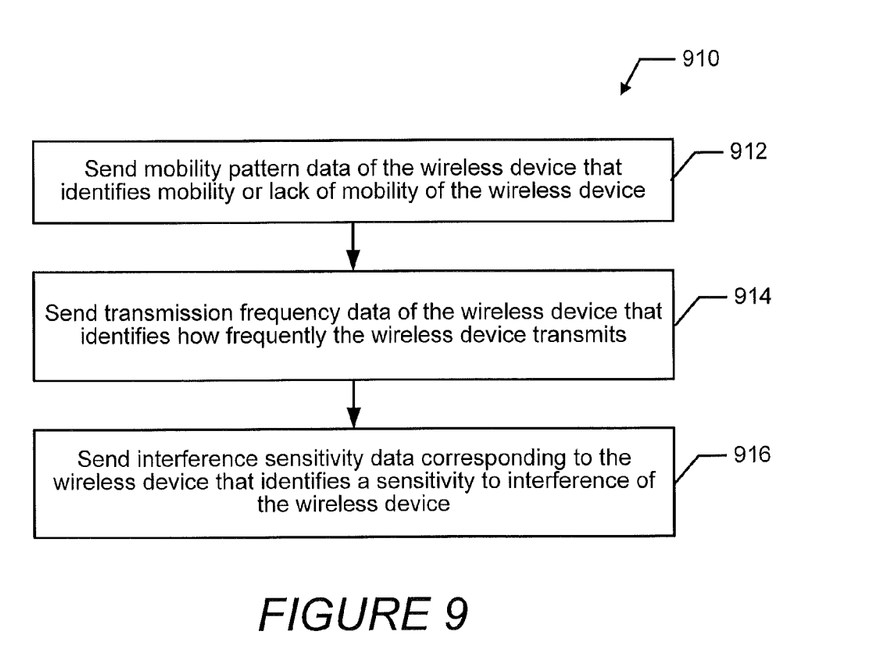

Brief reference is now made to FIG. 9, which is a flowchart identifying operations for methods and systems for sending data identifying a transmission-specific property from a radio network node to at least one other radio network node, as illustrated in block 910 of FIG. 8. Operations include sending mobility pattern data of the wireless device that identifies mobility or lack of mobility of the wireless device (block 912). The mobility pattern data may be beneficial especially in the context of a stationary wireless device such as a sensor because this characteristic may be semi-persistent and thus not require frequent updates of the data identifying the transmission-specific property. As such, data transmission requirements for ICIC corresponding to the wireless device may be reduced relative to conventional ICIC related IE's.

Additionally, transmission frequency data of the wireless device that identifies how frequently the wireless device transmits may be sent (block 914). By sending the transmission frequency data, a neighboring cell may avoid interference with the wireless device by scheduling resources out of phase with the transmissions of the wireless device. In some embodiments, interference sensitivity data corresponding to the wireless device that identifies sensitivity to interference of the wireless device may be sent (block 916).

Figure 10:
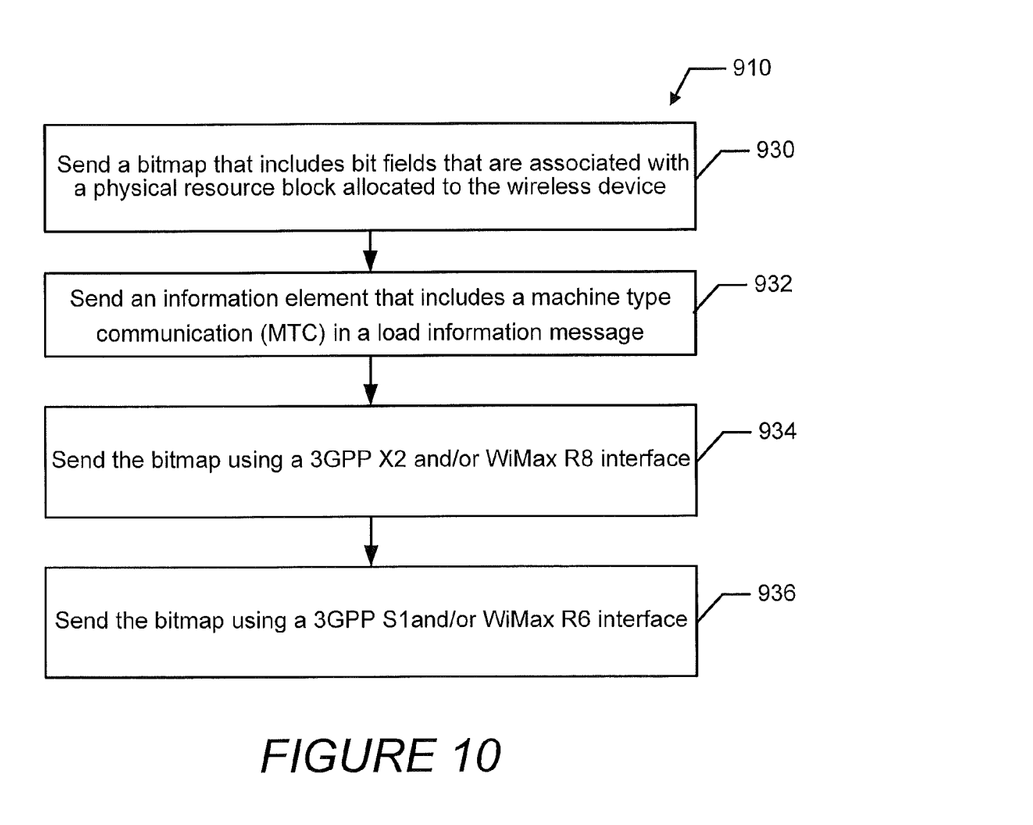

Brief reference is now made to FIG. 10, which is a flowchart identifying other operations for methods and systems for sending data identifying a transmission-specific property from a radio network node to at least one other radio network node, as illustrated in block 910 of FIG. 8. In some embodiments, operations include sending a bitmap that includes multiple bit fields. One or more of the bit fields may be associated with a PRB that is allocated to the wireless device by the radio network node for communications between the radio network node and the wireless device (block 930). In some embodiments, the bitmap may include multiple bit strings that may each correspond to a different transmission time interval. Each of the bit positions in the bit strings may be associated with a PRB corresponding to a different frequency range in a given transmission time interval.

Some embodiments provide that the bitmap may be sent via an IE that may be in a load information message (block 932). For example, the IE may include a MTC IE that is configured to include information to be exchanged between base stations of neighboring cells to support ICIC for MTC devices.

Figure 11:
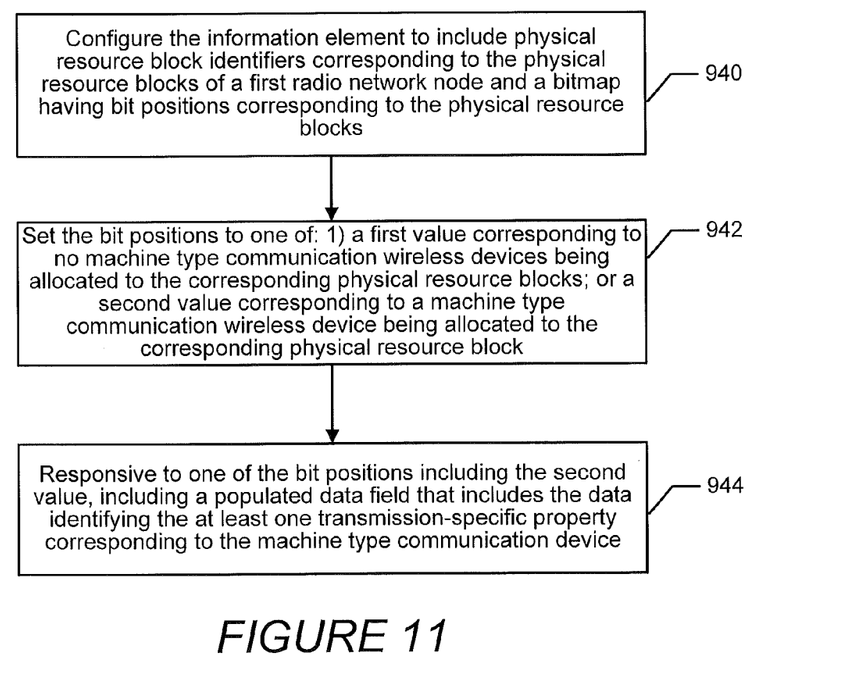

Briefly referring to FIG. 11, some embodiments provide that IE includes. PRB identifiers corresponding to the PRBs of the radio network node. The bitmap may include multiple bit positions corresponding to the PRBs of the radio network node (block 940). Values of the bit positions may be set to a first value corresponding to no MTC wireless devices being allocated to the corresponding PRBs or a second value corresponding to an MTC wireless device being allocated to the corresponding PRB (block 942). In some embodiments, the IE further includes a populated data field that includes data identifying a transmission-specific property corresponding to the MTC wireless device in response to a corresponding bit position including the second value (block 944).

Referring back to FIG. 10, some embodiments provide that the radio communications network may be configured to operate as a 3GPP ($3^{rd}$ Generation Partnership Project) Long Term Evolution (LTE) radio communications network. In such embodiments, the bitmap may be sent using a 3GPP X2 and/or WiMax R8 interface from the radio network node to other radio network nodes (block 934). Some embodiments provide that the bitmap may be sent using a 3GPP S1 and/or WiMax R6 interface (block 936).

Figure 12:
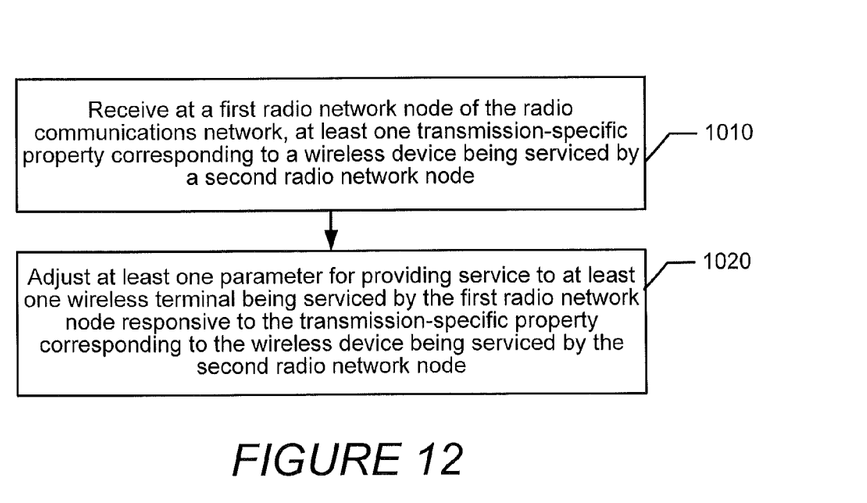

Brief reference is now made to FIG. 12, which is a flowchart identifying operations for methods and systems for operating a radio network node of a radio communications network. As described herein, the radio communications network includes multiple radio network nodes. One of the radio network nodes is operable to receive at least one transmission-specific property corresponding to a wireless device being serviced by another radio network node (block 1010). For example, some embodiments provide that a mobility pattern of the wireless device being serviced by the other radio network node that identifies mobility or lack of mobility of the wireless device is received. Additionally, a transmission-specific property may include a transmission frequency of the wireless device being serviced by other radio network node that identifies how frequently the wireless device transmits. Some embodiments provide that a transmission-specific property includes an interference sensitivity corresponding to the wireless device being serviced by the other radio network node that identifies a sensitivity to interference of the wireless device.

Figure 13:
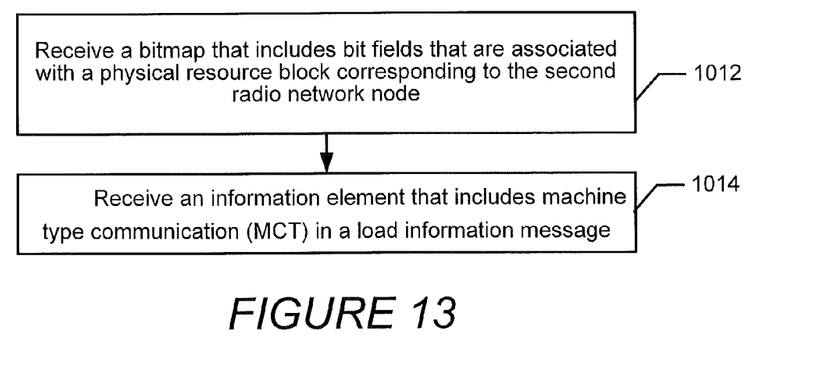
Figure 14:
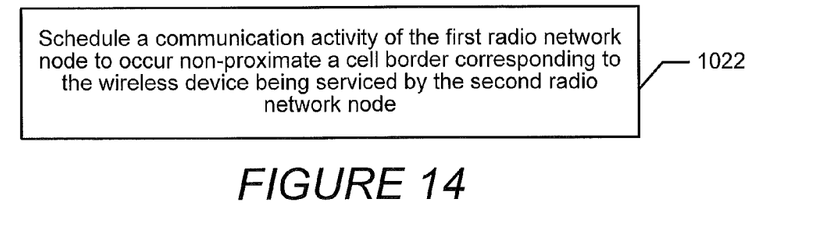

Brief reference is made to FIG. 13, which is a flowchart identifying operations corresponding to receiving the transmission-specific property as illustrated in FIG. 12 at block 1010. Some embodiments provide that a service area of the radio network node includes an overlapping portion with a service area of the other radio network node. Receiving the transmission-specific property may include receiving a bitmap that includes a plurality of bit fields, each of the plurality of bit fields associated with a PRB corresponding to the other radio network node (block 1012). The bit map may be received as an information element that includes a MTC and may be in a load information message (block 1014).

Referring back to FIG. 12, one or more parameters for providing service to at least one wireless device being serviced by the radio network node may be adjusted in response to the transmission-specific property corresponding to the wireless device being serviced by the other radio network node (block 1020). Brief reference is made to FIG. 14, which is a flowchart identifying operations corresponding to adjusting the service parameters as illustrated in FIG. 12 at block 1020. In some embodiments, adjusting a service may include scheduling a communication activity of the radio network node to occur non-proximate a cell border corresponding to the wireless device being serviced by the other radio network node (block 1022). In some embodiments, the wireless device being serviced by the other radio network node includes a mobility pattern corresponding to a stationary device. The wireless device being serviced by the other radio network node may be operable to transmit to the other radio network node on a regular interval. By including the mobility and/or transmission frequency and/or schedule of the wireless device being serviced by the other node, the radio network node may adjust service to other wireless devices to reduce or avoid interference with the wireless device serviced by the radio network node.

Figure 15:
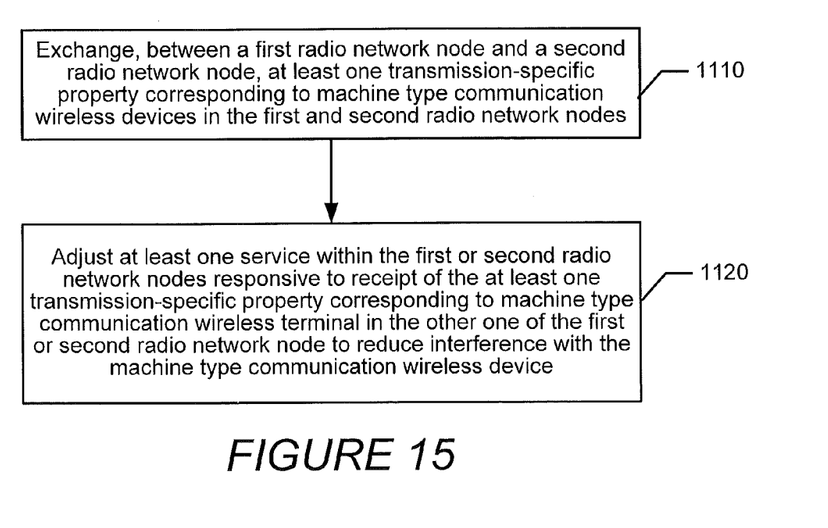

Reference is now made to FIG. 15, which is a flowchart illustration operations corresponding to methods and system for operating a radio communication network. Some embodiments provide that at least one transmission-specific property corresponding to machine type communication wireless devices in first and second radio network nodes of the radio communications network may be exchanged therebetween (block 1110). In response to receipt of a transmission-specific property corresponding to a MTC type wireless device, at least one service within the first or second radio network nodes may be adjusted in the other one of the first or second radio network node to reduce interference with the MTC wireless device (block 1120).

Figure 16:
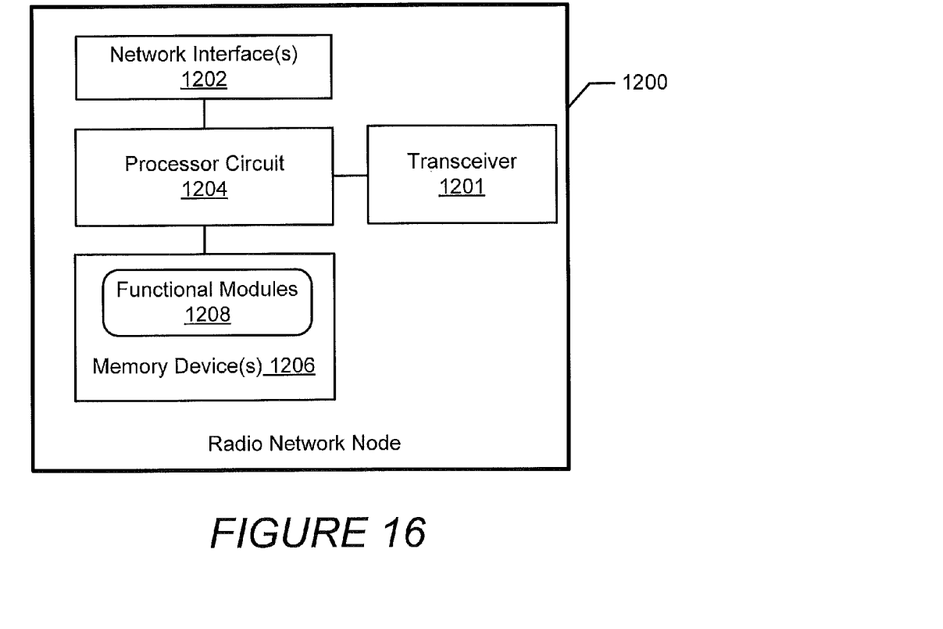
FIGS. 16 and 17 are block diagrams of a radio network node and a wireless device, respectively, configured according to some embodiments of the present invention.

Reference is now made to FIG. 16, which is a block diagram of a radio network node 1200 configured according to some embodiments of the present invention, and elements which may be included in one or more of the radio network nodes described above, such as the macro eNB 112, among others. The radio network node 1200 can include one or more transceivers 1201, a network interface(s) 1202, a processor circuit 1204, and a memory device(s) 1206 containing functional modules 1208.

The transceiver(s) 1201 (e.g., 3GPP compliant transceiver) is configured to communicate with a UE via wireless air-interface channels according to operations and methods disclosed herein, and may communicate through an antenna array. By providing a plurality of antenna elements in the antenna array, the radio network node 1200 may receive MIMO communications allowing spatial multiplexing and/or diversity gain. A maximum number of uplink MIMO channels that may be received simultaneously by the radio network node 1200 may be equal to the number of antenna elements included in the antenna array.

The processor 1204 may include one or more data processing circuits, such as a general purpose and/or special purpose processor (e.g., microprocessor and/or digital signal processor). In particular embodiments, the processor 1204 is configured to execute computer program instructions from the functional modules 1208 of the memory device(s) 1206, described below as a computer readable medium, to perform at least some of the operations and methods described herein as being performed by a base station or other radio network node in accordance with one or more embodiments of the present invention. In some embodiments, processor 1204 may represent, in whole or in part, dedicated circuitry designed or configured to provide the described functionality, such as application-specific integrated circuits (ASICs), field-programmable gate arrays (FPGAs), or other circuitry capable of providing a fixed or semi-static set of functionality.

In accordance with some embodiments, the network interface 1202 is configured to receive an MTC IE including receive at least one transmission-specific property corresponding to a wireless device being serviced by another radio network node. The processor 1204 is configured to adjust service parameters responsive to receiving the at least one transmission-specific property to avoid cell interference with an MTC wireless device in the other radio network node Reference is now made to FIG. 17, which is a block diagram of a wireless device configured according to some embodiments of the present invention. The UE 700 includes transceiver(s) 1302, a processor circuit 1304, and a memory device(s) 1306 containing functional modules 1308. The UE 700 may further include other elements, such as a display 1310, a user input interface 1312, and a speaker 1314.

Figure 17:
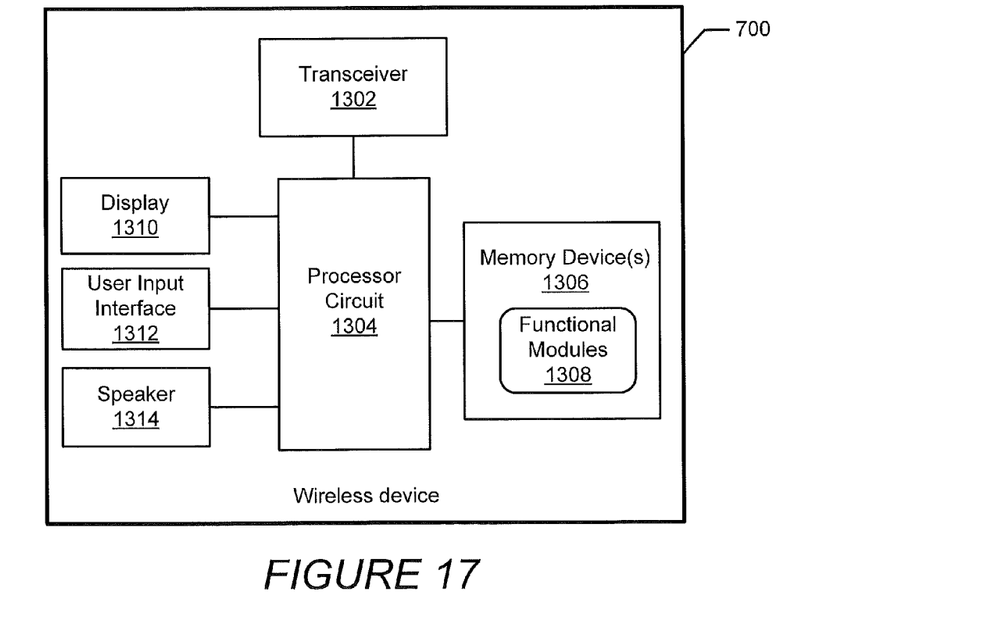

The transceiver 1302 is configured to communicate with a radio network node (e.g., base station, eNB) via wireless air-interface channels according to operations and methods disclosed herein, and may communicate through an antenna array. By providing a plurality of antenna elements in the antenna array, the UE 700 may receive MIMO communications allowing spatial multiplexing and/or diversity gain as discussed above. A maximum number of downlink MIMO channels that may be received simultaneously during multi-point and/or single-point MIMO by UE 700 may be equal to the number of antenna elements included in the antenna array.

The processor 1304 may include one or more data processing circuits, such as a general purpose and/or special purpose processor (e.g., microprocessor and/or digital signal processor). The processor 1304 is configured to execute computer program instructions from the functional modules 1308 of the memory device(s) 2306, described below as a computer readable medium, to perform at least some of the operations and methods described herein as being performed by a UE in accordance with one or more embodiments of the present invention.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

The invention claimed is:

1. A method of operating a radio network node of a radio communications network, the method comprising:
    identifying a wireless device in a cell of a first radio network node as having at least one transmission-specific property that affects a sensitivity of the wireless device to interference; and
    sending, from the first radio network node to a second radio network node that includes at least a portion of an overlapping cell relative to the first radio network node, data identifying the at least one transmission-specific property corresponding to the wireless device in the cell of the first radio network node,
    wherein sending the data identifying the at least one transmission-specific property of the wireless device comprises sending transmission frequency data of the wireless device that identifies how frequently the wireless device transmits, and
    wherein the wireless device in the cell of the first radio network node includes a mobility pattern that identifies that the wireless device is a stationary device that has a fixed location.

2. The method according to claim 1, wherein sending the data identifying the at least one transmission-specific property of the wireless device comprises:
    sending mobility pattern data of the wireless device that identifies mobility or lack of mobility of the wireless device; and
    sending interference sensitivity data corresponding to the wireless device that identifies a sensitivity of the wireless device to interference.

3. The method according to claim 1, wherein the data identifying the at least one transmission-specific property identifies a frequency range and transmission time interval allocated by the first radio network node to the wireless device to identify resource blocks that the second radio network node should avoid allocating to another wireless device.

4. The method according to claim 1,
    wherein sending data identifying the at least one transmission-specific property of the wireless device comprises sending a bitmap that includes a plurality of bit fields,
    wherein at least one of the plurality of bit fields is associated with a physical resource block allocated to the wireless device by the first radio network node for communications between the first radio network node and the wireless device.

5. The method according to claim 4,
    wherein sending the bitmap that includes the plurality of bit fields comprises sending an information element in a load information message,
    wherein the information element includes a machine type communication (MTC) information element.

6. The method according to claim 5,
    wherein the information element includes physical resource block identifiers corresponding to the physical resource blocks of the first radio network node and the bitmap having a plurality of bit positions corresponding to the physical resource blocks of the first radio network node,
    wherein ones of the plurality of bit positions are set to one of: a first value corresponding to no machine type communication wireless devices being allocated to the corresponding physical resource blocks; or a second value corresponding to a machine type communication terminal being allocated to the corresponding physical resource block, and wherein, responsive to one of the plurality of bit positions including the second value, the information element further includes a populated data field that includes the data identifying the at least one transmission-specific property corresponding to the machine type communication terminal.

7. The method according to claim 4,
wherein the radio communications network is configured to operate as a 3GPP ($3^{rd}$ Generation Partnership Project) Long Term Evolution (LTE) radio communications network, and
wherein sending the bitmap comprises sending the bitmap using a 3GPP X2 and/or WiMax R8 interface from the first radio network node to the second radio network node.

8. The method according to claim 4,
wherein the radio communications network is configured to operate as a 3GPP ($3^{rd}$ Generation Partnership Project) Long Term Evolution (LTE) radio communications network, and
wherein sending the bitmap comprises sending the bitmap using a 3GPP S1 and/or WiMax R6 interface.

9. The method according to claim 4, wherein sending the bitmap comprises sending a bitmap that includes a plurality of bit strings,
wherein each of the plurality of bit strings corresponding to a different one of a plurality of transmission time intervals, and
wherein each of the plurality of bit strings includes a plurality of bit fields, each of the plurality of bit fields associated with a physical resource block corresponding to a different frequency range.

10. The method according to claim 1, wherein the wireless device in the cell of the first radio network node includes transmission frequency data that identifies that the wireless device transmits at a regular transmission interval.

11. The method according to claim 1, wherein the at least one transmission-specific property that affects a sensitivity to interference indicates proximity of the wireless device to an adjacent cell or a low transmission power of the wireless device relative to other wireless devices.

12. A method of operating a radio network node of a radio communications network, the method comprising:
receiving at a first radio network node of the radio communications network, at least one transmission-specific property corresponding to a first wireless device being serviced by a second radio network node; and
adjusting at least one parameter for providing service to a second wireless device being serviced by the first radio network node responsive to the transmission-specific property corresponding to the first wireless device being serviced by the second radio network node,
wherein a service area of the first radio network node includes an overlapping portion with a service area of the second radio network node, and
wherein receiving the at least one transmission-specific property of the first wireless device comprises receiving a bitmap that includes a plurality of bit strings, wherein each of the plurality of bit strings correspond to a respective one of a plurality of transmission time intervals, wherein each of the plurality of bit strings comprises a plurality of bit fields, and wherein each of the plurality of bit fields is associated with a physical resource block corresponding to a different frequency range.

13. The method according to claim 12, wherein receiving the at least one transmission-specific property of the first wireless device comprises:
receiving a mobility pattern of the first wireless device being serviced by the second radio network node that identifies mobility or lack of mobility of the first wireless device;
receiving a transmission frequency of the first wireless device being serviced by the second radio network node that identifies how frequently the first wireless device transmits; and
receiving an interference sensitivity corresponding to the first wireless device being serviced by the second radio network node that identifies a sensitivity to interference of the first wireless device.

14. The method according to claim 12,
wherein receiving the bitmap that includes the plurality of bit fields comprises receiving an information element in a load information message,
wherein the information element includes a machine type communication (MTC).

15. The method according to claim 12, wherein adjusting at least one service to the second wireless device being serviced by the first radio network node includes scheduling a communication activity of the first radio network node to occur non-proximate a cell border corresponding to the first wireless device being serviced by the second radio network node.

16. The method according to claim 12,
wherein the first wireless device being serviced by the second radio network node includes a mobility pattern corresponding to a stationary device, and
wherein the first wireless device being serviced by the second radio network node is operable to transmit to the second radio network node on a regular interval.

17. The method according to claim 12, wherein the first wireless device being serviced by the second radio network node is operable to transmit to the second radio network node in response to an event that is detected by the first wireless device being serviced by the second radio network node.

18. A method of operating a radio communications network, the method comprising:
exchanging, between a first radio network node of the radio communications network and a second radio network node, at least one transmission-specific property corresponding to machine type communication wireless devices in the first and second radio network nodes; and
adjusting at least one service within the first or second radio network nodes responsive to receipt of the at least one transmission-specific property corresponding to machine type communication wireless device in the other one of the first or second radio network node to reduce interference with the machine type communication wireless device,
wherein the at least one transmission-specific property indicates proximity of the wireless device to an adjacent cell or a low transmission power of the wireless device relative to other wireless devices.

* * * * *